United States Patent Office 3,692,667
Patented Sept. 19, 1972

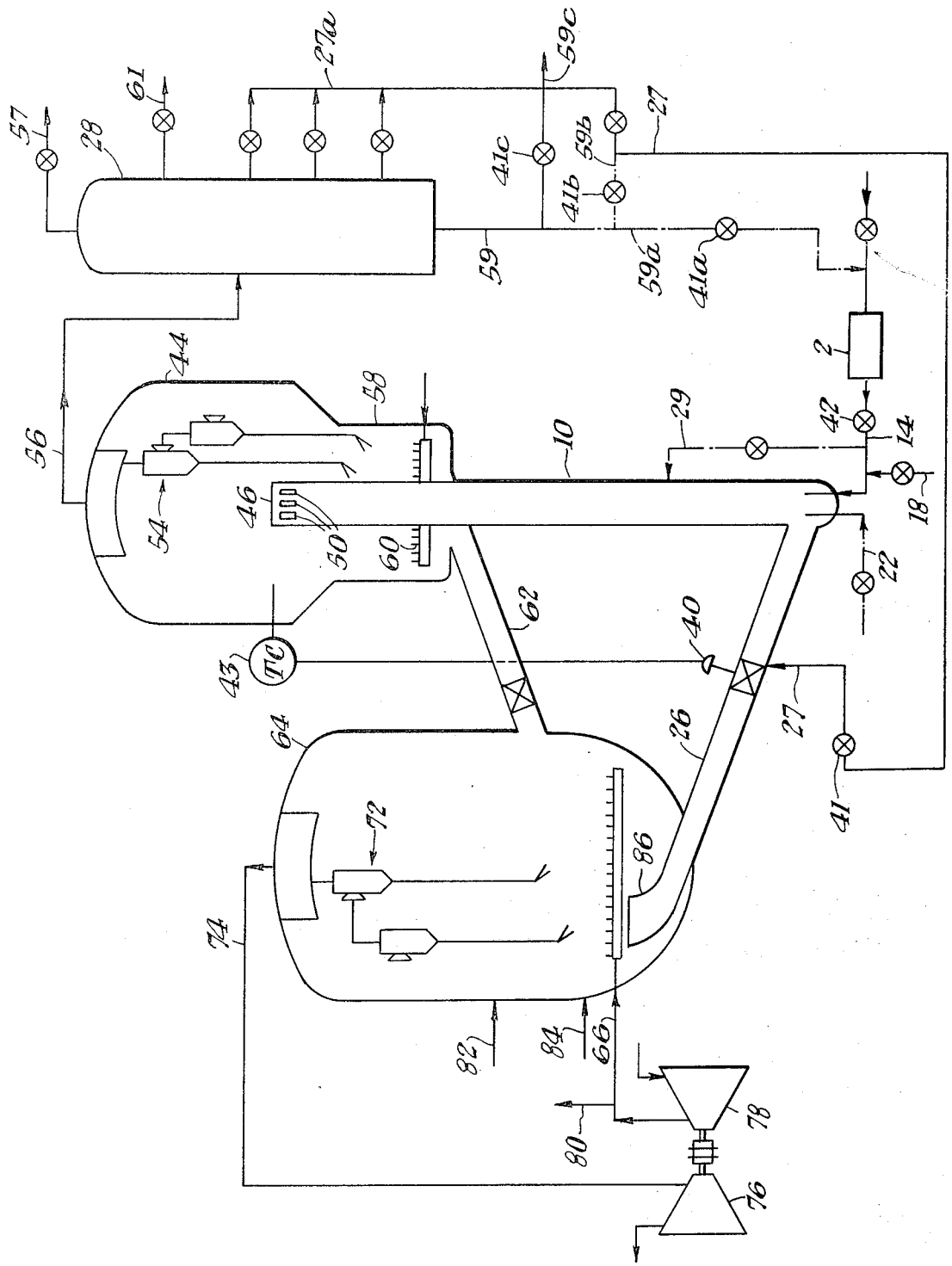

3,692,667
CATALYTIC CRACKING PLANT AND METHOD
Joel D. McKinney, Indiana Township, Allegheny County, and George F. Ondish, Penn Hills Township, Allegheny County, Pa., assignors to Gulf Research & Development Company, Pittsburgh, Pa.
Filed Nov. 12, 1969, Ser. No. 875,829
Int. Cl. C10g 11/18
U.S. Cl. 208—120
35 Claims

ABSTRACT OF THE DISCLOSURE

We disclose a process for cracking a primary hydrocarbon charge capable of being cracked to lower boiling constituents including petrochemicals and the like in the presence of a stream of fluidized cracking catalyst, said process comprising the steps of maintaining a predetermined range of temperatures within said catalyst stream, adding said charge to said catalyst stream, recycling at least a portion of the normally liquid effluent product of said cracking process to said catalyst stream, and adding said recycle portion to said catalyst stream at a point having a higher temperature than that at which said charge is added so that a significant proportion of said recycle effluent is cracked by said catalyst.

---

Our present invention relates to a method and means for catalytically cracking hydrocarbons, and more particularly to a catalytic cracking plant and method which is capable of producing an abundance of petrochemicals, light gasolines, fuel oils, and the like.

Present trends in the petroleum industry have caused concern over possible shortages of light olefins, aromatics, and other light ends. Although zeolitic aluminosilicates have demonstrated substantial increases in gasoline conversion in experimental and conventional processes, they tend to yield less light olefins and other light ends than the previously used amorphous silica-alumina catalysts. Concurrently with present day downward trends in the production of light olefins and other light ends and aromatics, these materials are experiencing an increased demand throughout the petroleum industry for general petrochemical usage as well as sources of high octane alkylate and other gasoline blending stocks.

There is also an urgent need in many parts of the world for a versatile catalytic cracking plant which is capable of producing an abundance of petrochemicals in addition to the specialized gasolines and fuel oils. There is a further need, for example in many European countries, for a catalytic cracking plant which is capable of producing a preponderance of lighter gasolines, i.e. those which are susceptible to octane upgrading with the more readily available and inexpensive lead compounds. In addition, the lighter gasolines are more desirable for use in colder climates or in the cold weather seasons generally. Another desirable characteristic of the catalytic cracking plant in question is the production of gasolines, when desired, containing not only the lighter ends, as mentioned previously, but also having a higher percentage of olefinic gasolines, which, as well known, exhibit a higher octane rating than the corresponding paraffins.

Such high octane, low boiling components are a preferred gasoline stock in forein countries for solving fuel maldistribution problems in the manual transmission, long intake manifold cars which are typical. This is achieved by providing more even octane distribution in the fuel without exceeding volatility limits.

Although the need for an efficient petrochemical plant is virtually universal in the more technically advanced nations, the versatility of the catalytic cracking plant contemplated by this invention is particularly useful in those countries where petroleum technology is less highly specialized.

Even in this country, where petroleum technology is highly specialized, there is an urgent need for an efficient petrochemical plant embodying means and methods for producing a preponderance if not a total production of the various petrochemicals. Whether the catalytic cracking plant, as contemplated by the invention, is employed for intermittent or total petrochemical and light gasoline production, there is a considerable demand in all technically advanced nations for a catalytic plant of the character described which is capable of volume production of the less plentiful petrochemicals such as the $C_2$–$C_5$ olefins and the $C_7$, $C_8$ aromatics.

Finally, an important advantage of the projected catalytic cracking plant is its ability to control the ratio of gasoline to fuel oil production, and to limit the preponderance of its total production either to valuable petrochemicals, e.g. the $C_2$–$C_5$ gases and the $C_7$, $C_8$ aromatics, or to the usual gasoline production, or to specialized gasoline production, e.g. the aforementioned lighter and/or olefinic gasolines, or to a combination of these which may additionally include the heavier gasolines, i.e. light fuel oils.

For the accomplishment of these desirable ends, we contemplate the provision of method and means for catalytically cracking a hydrocarbon feed stock wherein part or all of the normally liquid components of the cracked product are recycled or refluxed through the cracking zones. For example, when we desire to limit the total production of the catalytic plant to petrochemical gases ($C_2$–$C_5$) we recycle all of the liquid product ($C_6$ and higher) through the catalytic cracking zone or zones.

On the other hand, certain of the liquid products, such as the $C_7$, $C_8$ aromatics which have considerable value as petrochemicals can be separated from the liquid distillate before the latter is recycled through the cracking apparatus. In another illustration of petrochemical usage, we would desirably withdraw all of the $C_6$ materials with or without a portion of the $C_7$ fraction, for example the iso-$C_7$ compounds.

In a preferred cracking procedure of our invention, we recycle the $C_7$ and heavier gasolines, with or without the iso-$C_7$ materials as mentioned previously. In the latter case, we prefer to recycle those gasolines boiling between about 180° and about 330° F. or in some cases up to about 375° F. In this method of operation, the higher boiling gasolines, i.e. those boiling between about 330° or 375° and about 430° F. can be withdrawn for use as specialized fuel oils. The lighter gasoline ends ($C_5$, $C_6$, iso-$C_7$) find use for petrochemicals or for cold climate gasoline blends or otherwise in those areas where there is a scarcity of the more complex lead compounds and where improved octane distribution is desired. As noted previously, the lighter gasolines are more susceptible to octane improvement with the less complex lead additives and are a preferred component for solving maldistribution knock problems in foreign automobile engines.

A noteworthy characteristic of our catalytic operation is that we are able to achieve a partial or complete cracking, as desired, of the liquid product of the cracking operation by recycling the liquid product through the apparatus. This cracking or recracking of the recycled liquid product, or a portion thereof depending upon the end usage of the cracking plant, is quite unexpected in view of the more refractory nature of the recycle liquid. In accordance with our invention, this recycle liquid is composed principally of pyrolitic naphthas, i.e. the product of a previous cracking of the principal hydrocarbon feed.

Another unexpected result of the application of our novel method and means for catalytic cracking is that substantially a total conversion of the basic or principal hydrocarbon feed is achieved without the use of duplicate facilities. This attendant result also stems from the particular method and means by which we recycle the liquid product or portion thereof such that cracking or recracking of the considerably more refractory recycle liquid can be accomplished within our novel cracking facilities, which does not entail extensive modification of known apparatus. Thus, essentially duplicative facilities are avoided. In an equivalent conventional operation, specialized cracking facilities would be required for recracking of the pyrolitic naphthas or for primary cracking of the unconverted portions of the liquid product of the initial cracking operation.

We also contemplate methods and means for controlling the cracking conditions of the recycle liquid so that one or more components or classes of components thereof will not be recracked as desired. We also contemplate a removal of part or all of the olefinic content of the liquid product before the latter is recycled. As noted previously, certain olefinic compounds possess a higher octane rating than the corresponding paraffins and thus may be more valuable as gasolines than as petrochemicals, particularly in Europe.

We have found that a typical content of the recycle liquid, where the preferred recycle liquid is limited to the $C_7+$ naphthas, includes 20–40 percent aromatics, 20–60 percent olefins, and 15–25 percent saturates. As noted above, certain of these components can be extracted, depending upon their economic value in a specific area before the liquid product is recycled.

In the process of cracking of a hydrocarbon molecule it is known that an olefinic bond first forms at the cracking sites and is followed by an actual cracking at the location of the double bond. It is also known that this procedure can be terminated or suspended at the olefinic stage such that actual cracking of the molecule does not occur. In view of these considerations, another unexpected result and advantage of our invention is a controlled olefin production and/or cracking of the recycle liquid which is made possible by our novel means and method. Thus the recycle liquid, which in most instances, comprises more refractory naphthas or gasolines, can be subjected to a controlled catalytic cracking procedure for a preponderance of olefinic production, a mixture of olefins and cracked paraffins, or a substantially complete production of paraffins. In each case, production can be further imbalanced in favor of the lighter ends ($C_2$–$C_5$) and/or light gasoline.

In view of the more refractory character of the recycle liquid, we provide novel means and method for the efficient and catalytical cracking, either partially or substantially completely as desired, of the recycle liquid without a substantial change in the conventional catalytic cracking apparatus and without the duplication thereof which would be otherwise necessary.

Owing to the more refractory character of the recycle liquid, it is necessary to return the recycle liquid to a point in the cracking system at a higher temperature than the primary cracking zone, to which the basic hydrocarbon feed stock is introduced. This can be accomplished by introducing the recycle liquid into the catalytic stream at a point upstream of the introduction of the primary feed stock. The distance between these points defines a secondary reaction zone, which in accordance with the invention is maintained at a higher temperature to effect catalytic cracking of the more refractory recycle liquid. The residence time of the recycle liquid in the secondary reaction zone can be varied, further in accordance with the invention, in a number of ways to control the cracking operation. For example, the point of introduction of the recycle liquid can be shifted upstream or downstream, the quantity and rate of introduction of the recycle liquid can be varied, and the space velocity of the catalytic stream itself can be varied. In addition the cracking operation in the thus defined secondary reaction zone can be modified by varying the temperature of the recycle liquid at its point of introduction or by varying the temperature of the catalytic stream itself.

It is also contemplated that, in addition to the recycle naphtha or the like, that an unconverted portion of the gas, oil or other hydrocarbon feed can be recycled either to either of the primary and secondary reaction zones. For example, such unconverted portion, which may amount to about 15–40 percent by volume of the fresh hydrocarbon feed can be introduced either with the recycle liquid or directly with the hydrocarbon feed. The respective quantities of the two recycle liquid streams, where the recycle of unconverted portion is optionally employed, can be counterbalanced to achieve specific temperature and velocity patterns in the primary and secondary reaction zones.

The flow characteristics of the catalyst and feed stock and recycle streams are otherwise controlled throughout the respective reaction zones to avoid backmixing, aftercracking (when undesired), and catalyst slip, as set forth hereinafter in detail.

We accomplish these desirable results by providing a process for cracking a primary hydrocarbon charge capable of being cracked to lower boiling constituents including petrochemicals and the like in the presence of a stream of fluidized cracking catalyst, said process comprising the steps of maintaining a predetermined range of temperatures within said catalyst stream, adding said charge to said catalyst stream, recycling at least portion of the normally liquid effluent product of said cracking process to said catalyst stream, and adding said recycle portion to said catalyst stream at a point having a higher temperature than that at which said charge is added so that a significant proportion of said recycle effluent is cracked by said catalyst.

We desirably provide a similar catalytic cracking process including the additional step of establishing a ratio of said recycled effluent to said primary charge and establishing a residence time of said primary charge in said catalyst stream such that a greater percentage yield of gaseous petrochemicals based on total hydrocarbon feed is recovered from said process in the presence of said recycled effluent than could be recovered from said process in the absence of said recycled effluent.

We desirably provide a similar catalytic cracking process including the additional step of establishing the ratio of said recycled effluent to said primary charge such that a greater percentage yield of light gasoline based on total primary charge is recovered from said process in the presence of said recycled effluent than could be recovered from said process in the absence of said recycled effluent.

We desirably provide a similar catalytic cracking process including the additional step of establishing the ratio of said recycled effluent to said primary charge and a predetermined temperature and residence time of said recycled effluent in said catalyst stream prior to engagement with said primary charge such that the production of intermediate distillates and heavy gasolines is minimized.

We desirably provide a similar catalytic cracking process including the additional steps of adding said recycle effluent to said catalyst stream at a predetermined point upstream of said principal charge addition, and separating the points of said recycle effluent and said charge additions to aid in establishing a predetermined residence time of said recycle effluent in said catalyst stream prior to cracking of said primary charge.

We desirably provide a similar catalytic cracking process including the additional step of recycling an unconverted portion of said primary charge to said catalyst stream.

We also desirably provide, in a catalytic cracking plant, the combination comprising conduit means for defining primary and secondary reaction zones and for communicating said zones one with the other, means for regenerating and recirculating a catalyst stream through said zones, means for supplying a primary hydrocarbon charge to the inlet of said primary zone, means coupled to the outlet of said primary zone for collecting and separating the products of said plant, and recycle conduit means coupled to said collecting and separating means and to the entrance of said secondary zone for conveying a portion of said products to said secondary zone.

We also desirably provide a similar catalytic plant wherein additional recycle conduit means are coupled to said collecting and separating means and to the entrance of said primary zone for conveying a portion of said products to said primary zone.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawing I have shown certain presently preferred embodiments of the invention and have illustrated certain presently preferred methods of practicing the same.

In the drawing we have shown a schematic fluid circuit diagram of certain forms of catalytic cracking plant arranged in accordance with our invention.

For a better understanding of the apparatus and method depicted in the drawing, it should be noted that the present invention is particularly useful in connection with cracking processes utilizing fluidized catalysts. Natural or synthetic zeolite, alumino-silicate cracking catalysts exhibit high activity in the cracking of hydrocarbon oils, such as gas-oil boiling in the range of about 430° to about 1000° F., both in terms of total conversion of feed stock and in terms of selectivity towards gasoline and particularly naphtha production. Through our present invention, we have been enabled, unexpectedly, to further crack the gasoline fraction, and particularly the naphtha portion thereof, produced as an intermediary product by our process in order to obtain various types of petrochemicals, light gasoline ends, and specialized fuel oils.

Further cracking of the naphtha and related fractions is obtained in our novel cracking operation by utilizing novel means and methods involving substantially concurrent utilization of the fluidized zeolite cracking catalyst or a catalyst of comparable activity and/or selectivity. Although zeolite alumino-silicates are especially useful catalysts for the purpose of the present invention, any silica alumina or other cracking catalyst which is sufficiently active and/or selective can be utilized. For optimum conversion, residence times are usually limited to about five seconds or less. In our process, which is directed primarily to the production of petrochemicals and light gasolines, residence times are limited to avoid "aftercracking" and resultant polymerization of the product. Aftercracking is avoided also, in accordance with our invention, by timely disengagement of the hydrocarbon and catalyst to avoid undue deposition of carbon or coke upon the catalyst.

It is known, of course, that a pyrolitic naphtha fraction (or a virgin naphtha) can be cracked or recracked to obtain light olefins and other petrochemicals. For the most part, the process has been generally unrewarding, as ordinary processes for the production of gasoline provided ample petrochemicals until recently. Further, the cracking of naphtha alone is difficult to sustain on a continuous basis as this cracking operation deposits very little coke or residual carbon upon the fluidized catalyst. Although one feature of our present invention takes advantage of this fact, naphtha cracking by any of the known processes results in a minimal carbonization of the catalyst, which is insufficient to supply the heat required for reheating and regenerating the catalyst. We provide, therefore, means and methods for an unexpectedly efficient cracking of naphtha with minor modification of conventional cracking plants and with a capability of a fine degree of control for producing a preselected range of petrochemicals and light gasoline stocks.

In carrying out our invention, we recycle or return a substantial portion of the liquid effluent produced by the cracking operation to the catalyst stream. Preferably, the recycle liquid is added to the catalyst stream at a predetermined distance upstream of that point at which the principal hydrocarbon charge or gas oil is added to the catalyst. The intervening distance, therefore, defines a secondary cracking or reaction zone. The temperature of the catalyst stream at the point of entry of the recycle liquid is adjusted such that the temperature of the catalyst at the entrance to the secondary reaction zone ranges from 150° or 200° to about 300° F. preferably about 250° F.) higher than the temperature of the catalyst at the entrance to the primary reaction zone. Alternatively, the recycle liquid and the principal hydrocarbon feed can be added at spaced locations within the same cracking reaction zone, in order to attain the aforementioned temperature difference. The recycle liquid, which is more refractory than the principal hydrocarbon charge, is added at the aforementioned high temperature so that it undergoes the cracking reaction prior to subsequent admixture with the principal hydrocarbon feed, which of course instantly lowers the catalyst temperature to supply the necessary heat of vaporization. The addition of the recycle liquid is controlled, however, such that the attendant temperature drop of the fluidized catalyst does not fall below that required for efficient vaporization and cracking of the principal hydrocarbon or gas oil charge. The respective point of introduction of the recycle liquid and the principal hydrocarbon are sufficiently separated so that adequate contact or residence time of the flowing catalyst and recycle streams is provided before the main hydrocarbon feed stream is encountered with attendant lowering of the catalyst temperature. As noted previously, vaporization and cracking of the recycle liquid upstream of the principal hydrocarbon feed leaves very little residual carbon upon the fluidized catalyst and thus its efficacy for subsequent cracking of the principal hydrocarbon charge is substantially unimpaired.

More specifically, in accordance with the present invention a preheated principal hydrocarbon or gas oil charge and a preheated fluidized zeolite or comparable cracking catalyst are added to the primary reaction zone of the cracking unit. The space velocity and residence time of the principal hydrocarbon charge is established such that a maximum production of gasolines and light fuel oils is attained together with $C_2$–$C_5$ petrochemicals and similar products. The effluent product of the cracking unit is then fed to a conventional distillation column, and at least a portion of the liquid effluent of the distillation column is recycled to the catalytic cracking unit. Where a preponderance of $C_2$–$C_5$ light ends is desired, the residence time in the primary reaction zone can be decreased to inhibit aftercracking.

In an exemplary application of the invention, the liquid effluent of the distillation column can be subdivided into light gasolines, naphthas, and fuel oil fractions. The light gasoline and fuel oils can be withdrawn as final products or for subsequent blending materials. The naphtha fraction, for example that boiling between about 180° F. and 330° F. is recycled to the aforementioned secondary reaction zone of the cracking unit. The light ends ($C_2$–$C_5$) of the distillation column are withdrawn as gaseous materials for subsequent use as petrochemicals and in some cases ($C_4$–$C_5$) as gasoline blending agents.

It will be appreciated that the recycle liquid need not be limited to the middle gasolines, (naphthas) and that lighter or heavier gasoline stocks (e.g. 150° F.–375° F.) can be included in the recycle liquid. In view of the increased demand for petrochemicals, it is contemplated that all of the liquid effluent or at least that portion thereof boiling within the usual gasoline range (150°–430° F.) can be recycled through the catalytic cracking unit so that the production thereof is essentially limited to light ends ($C_2$–$C_5$ or $C_6$).

In another exemplary application of our invention, it is contemplated that the very light gasolines ($C_4$–$C_6$) and the fuel oils (330° or 375°–430° F.) can be withdrawn from the liquid fraction and the balance recycled. The light gasoline product can be extended to the N-$C_7$ or to the iso-$C_7$ fractions. Thus the recycled naphtha fraction can include the $C_7+$ or iso-$C_7+$ or $C_8+$—330° or 375° F. fraction. As noted above, other portions of the middle distillates or all of the gasolines (butanes-400° or 430° F.) can be recycled. Owing to the recycling feature of our invention, with or without the employment of the phenomenon of recracking mentioned above, a principal hydrocarbon feed can be limited to a heavy gas oil for example that boiling between about 700° to about 1000° or 1100° F.

In the cracking operation, it is known, of course, that actual subdivision of the molecule is preceded by the formation of an olefinic bond. In view of the value and the diminishing supply of olefins, we also contemplate a modification of the cracking operation to enhance the production of olefins, when these materials are desired for alkylation purposes or other petrochemical usage. This can be accomplished by limiting the residence time in the primary reaction zone, but the attendant loss of production usually is undesirable. Therefore, in accordance with another feature of our invention, the aforementioned recycle liquid can be added at a point which is a short distance upstream of the principal hydrocarbon addition, and relatively narrowly separated therefrom. The resultant, very short residence time of the recycle liquid in the corresponding, more sharply defined secondary reaction zone produces a preponderance of olefinic materials. By the same token, the point of recycle addition can be moved further upstream to achieve longer residence times for a substantially increased conversion of the recycle liquid, reduction in light olefin production, and increased yield of light gasolines. The adjustment in length of the secondary reaction zone in this manner does not appreciably affect the temperature conditions in the primary reaction zone, as the temperature drop associated with combining the recycle and catalyst streams is essentially instantaneous as a result of the vaporization of the recycle liquid. Thereafter, the temperature of the catalyst stream does not drop appreciably until the principal hydrocarbon feed stream is encountered.

In a modification of our invention part or all of an unconverted portion of the principal charge, i.e. the distillate bottoms can be recycled with the naphtha or similar distillates. Desirably the latter recycled portion, which can be limited to about 15–40 percent by volume of the principal hydrocarbon charge, is added to the primary reaction zone with the principal charge. Alternatively, the distillate bottoms or a portion thereof can be added to the secondary reaction zone together with the recycled middle distillates.

When contacted by the catalyst stream, the one or more recycle streams are substantially instantaneously vaporized and a substantial proportion thereof is almost immediately cracked and/or subjected to olefinic bond formation to produce the aforementioned gaseous petrochemicals, light gasolines, olefins, and other light ends, together with middle distillates, if the bottoms recycle is employed. At this time also, depending upon residence time and catalyst temperatures, aromatic constituents can be converted to olefins or paraffins. At the downstream end of the secondary reaction zone, the temperature of the combined fluidized catalyst and recycle stream has dropped to that which is appropriate for cracking the principal hydrocarbon charge, which is usually a gas oil boiling in the range of about 430° F. to about 1000° F. or 1100° F.

In accordance with the invention, the catalytic unit is operated so that there is a continual increase in yield throughout substantially the entire length of the unit coupled with a corresponding decrease in the unreacted proportion of the hydrocarbon feed. Accordingly, the reaction can be terminated on each reaction zone at or near the time of maximum yield to avoid over-carbonization of the catalyst. Backmixing in the primary and secondary reaction zones preferably is avoided, as this would lead to aftercracking and difficulty in controlling the cracking reaction. Backmixing can result from an excessive linear velocity and attendant turbulence, or by the formation of a dense catalyst bed which induces turbulence in the flowing vapors.

The cracking reaction should be permitted to proceed long enough to crack any mono- or di-aromatics or related naphthas, because their reaction products result in relatively high yields, but the reaction should be terminated before significant cracking of other poly-nuclear aromatics occurs, as cracking of these latter compounds occurs at a slower rate and results in excessive carbonization of the catalyst. It is clear, therefore, that no fixed cracking time duration can be established in either cracking zone, but the time will have to be chosen within the aforesaid range depending upon a particular system. By recycling at least a portion of the normally liquid effluent of the catalytic unit, a substantially total conversion of the primary hydrocarbon feed can be accomplished. The reaction temperature in the primary reaction zone, in accordance with this invention, can range between about 900° F. and about 1100° F. Desirably, the temperature range is maintained between 950° F. and 1000° F. The pressure in the primary reaction zone can vary widely and can be for example 5–50 p.s.i.g. or preferably 20–30 p.s.i.g. The pressure in the secondary reaction zone or zones (where the recycle liquid is cracked in the absence of primary hydrocarbon charge) desirably is maintained within the range of 5–50 p.s.i.g. The maximum residence time in the primary reaction zone is 10 seconds and for most charge stocks, the residence time will be about 2 to 5 seconds in most cases. For high molecular weight charge stocks which are rich in aromatics, a residence time of at least 0.5–1.5 seconds is suitable in most cases in order to crack mono- or di-aromatics and naphthenes which are the most easily cracked aromatics and which produce the highest petrochemical and light gasoline yields. Usually it is desirable to terminate the cracking operation before appreciable cracking of poly-aromatics occurs because these materials produce high yields of coke.

In order to minimize the carbonization of the catalyst in the secondary reaction zone, the maximum residence time of the combined catalyst and recycle streams is limited to a range of about 2 seconds to about 20 seconds and preferably 2–10 seconds. As noted above, the olefinic production can be enhanced with shorter residence times as well as with lower reaction temperatures. Limitation of the residence time in the secondary reaction zone in this manner maximizes the conversion of the recycle liquid but minimizes the reduction in catalytic effect of the zeolite material when subsequently engaged with the primary hydrocarbon charge at the entrance to the primary reaction zone. Limitation of residence time also avoids aftercracking of the recycle liquid and attendant production of coke.

The quantity of recycle liquid, added to the entrance of the secondary reaction zone or zones can vary between about 5 and about 45 percent by volume (with about 20–45 percent being preferred) based on the primary hydrocarbon charge. Preferably the quantity of recycle liquid added to the secondary reaction zone or zones is limited to about 45 percent by volume in order to provide an adequate residence time in the secondary reaction zone and to limit the deposition of coke on the catalyst.

The length to diameter ratio of the primary reaction zone can vary widely, but the primary zone should be elongated to provide high linear velocity, for example in the order of 25–75 feet per second, and to this end a length to diameter ratio of about 20–25 is suitable. The primary reaction zone can have a uniform diameter or can be provided with a continuous taper or one or more stepwise increases in diameter along the reaction path to maintain a nearly constant velocity along the flow path. The amount of recycle liquid supplied to the secondary reaction zone can be varied in dependance upon the ratio of primary hydrocarbon to the total flow stream in the primary reaction zone for control purposes.

In accordance with the invention, the temperature of the initially admixed catalytic and recycle streams at the entrance of the secondary reaction zone is maintained in the range of about 150° F. to about 300° F. (and preferably about 250° F.) higher than the fluid stream temperature adjacent the entrance of the primary reaction zone. A desirable temperature range in the secondary reaction zone is 1200°–1250° F., although the secondary reaction zone can be operated with a substantial degree of success in the temperature range of about 1150°–1300° F. The higher temperature range in the secondary reaction area is desirable to promote cracking or other conversion of the more refractory recycle liquid.

The higher temperatures maintained in the secondary reaction area also increases the selectivity of the secondary cracking reaction to light olefins. As noted previously, an increased olefinic production is advantageous for use in subsequent gasoline production or other petrochemical usage. Notwithstanding the higher cracking temperature in the secondary reaction area, the deposition of coke from the recycle liquid upon the catalyst is extremely low so that the efficacy of the catalyst for subsequent cracking of the principal hydrocarbon feed is substantially unimpaired. An unexpected result attains, in that the more refractory recycle liquid can be cracked on a continuous basis, as a result of the subsequent carbonization of the catalyst in the primary reaction zone. In the absence of such carbonization, a catalyst system employed for cracking the recycle liquid or similar material alone would not be self-sustaining as the catalyst could not be regenerated.

In the primary reaction zone, at least half of the heat of the catalyst is immediately taken up by vaporization of the hydrocarbon feed and the remainder is applied to cracking the primary charge. The heat of vaporization of gas oil for example is about the same as the heat of the cracking reaction or about 80 B.t.u. per pound for cracking in comparison with about 90 B.t.u. per pound for vaporization. Thus, little heat is available for cracking or aftercracking of the recycle liquid constituents when the latter enters the primary reaction zone with the catalyst stream. The desirability of adding the recycle-liquid and the primary hydrocarbon feed at spaced locations in the reactional system is thereby apparent.

Up to about 80 percent of the recycle liquid can be cracked or converted in the secondary reaction area in a given pass through the catalytic unit. However, the conversion of the recycle liquid can be substantially total by including the unconverted portion from any one pass in subsequent recycles. A significant and increased production of $C_2$–$C_5$ petro-chemicals including $C_3$, $C_4$ and $C_5$ olefins results from our novel cracking operation. As much as 45 percent by volume of recycle liquid, based on the combined primary charge and recycle constituents in the primary zone, has been employed without deleteriously affecting the reaction in the primary cracking zone. On the other hand, the amount of coke deposited upon the fluidized catalyst by cracking of the recycle material is less than 0.1 percent by weight.

A zeolite catalyst is a highly suitable catalytic material for use with this invention. A mixture of natural and synthetic zeolites can be employed. Also a mixture of crystalline zeolitic aluminosilicates with non-zeolitic amorphous silica-alumina is suitable as a catalytic entity. Any catalyst containing zeolitic material or otherwise which provides a maximum production yield within about a 10 second residence time is suitable. The catalyst particle size must render it capable of fluidization as a disperse phase in the reaction. Particle size characteristics are as follows:

| Size (microns): | Weight percent |
|---|---|
| 0–20 | 0–5 |
| 20–45 | 20–30 |
| 45–75 | 35–55 |
| >75 | 20–40 |

These particle sizes are usual and have not been preselected for this invention. A suitable weight ratio of catalyst to primary hydrocarbon is about 4:1 to about 12:1 or 15:1 or even 25:1 generally, or 6:1 to 10:1 preferably. On the other hand the weight ratio of catalyst to recycle material can vary between about 15:1 and about 100:1. The primary hydrocarbon feed generally is preheated to about 600° F. to about 700° F., but is generally not vaporized during preheat. The additional heat required to achieve the desired reactor temperature is imparted by the still hot, regenerated catalyst and added recycle material issuing from the secondary reaction area.

The weight ratio of catalyst to hydrocarbon charge is varied to affect variations in reactor temperature. Furthermore, the higher the temperature of the regenerated catalyst the less catalyst is required to achieve a given reaction temperature. Therefore, a high regenerated catalyst temperature will permit the very low reactor density level set forth below and thereby help to avoid backmixing in the reactor. Generally, catalyst regeneration can occur at an elevated temperature of about 1240° F. or 1250° F. or more to reduce the level of carbon on the regenerated catalyst from about 0.6 to 1.5 to about 0.05 to 0.3 percent by weight. At usual catalyst to oil (naphtha and gas oil) ratios the quantity of catalyst is more than ample to achieve the desired catalytic effect, in both the primary and secondary reaction zones, and therefore if the temperature of the catalyst is high, the ratio can be safely decreased without impairing conversion. Since zeolitic catalysts are particularly sensitive to the quantity of carbon deposited thereon, regeneration advantageously occurs at elevated temperatures in order to lower the carbon level on the catalyst to the stated range or lower. Moreover, since an important function of the catalyst is to contribute heat to the reactor, for any given desired series of reaction zone temperatures, the higher the temperature of the catalyst charge the less catalyst is required, the lower the catalyst charge rate, and the lower the density of the material in the reaction zones. As stated, low reaction zone densities help to avoid backmixing and aftercracking.

The reactor linear velocity, while not being so high that it induces turbulence and excessive backmixing, must be sufficiently high that substantially no catalyst accumulation or build-up occurs in either reaction zone, for such accumulation itself leads to backmixing. Therefore, the catalyst to hydrocarbon weight ratio at any position throughout each of the reaction zones desirably is maintained about the same. Stated another way, both the catalyst and hydrocarbon streams, at any linear position along the reaction path in each cracking zone, flow concurrently at about the same linear velocity, thereby avoiding significant slippage of catalyst relative to the hydrocarbon component. A build-up of catalyst in either reaction zone leads to a dense bed and backmixing which in turn increases the residence time in that zone for at least a portion of the charge and induces aftercracking.

Avoiding a catalyst build-up in the reaction zones results in a minimal catalyst inventory which in turn results in a high space velocity. Therefore a space velocity of over 100 or 120 weight of primary hydrocarbon feed per hour per weight of catalyst inventory and about 20 to 60 weight of recycle feed per hour per weight of catalyst inventory is highly desirable. In the primary reaction zone the space velocity should not be below 35 and can be as high as 500 with reference to the combined primary feed and recycle constituents. Owing to the low catalyst inventory and low charge ratio of catalyst to total hydrocarbon, the density of the material at the inlet of the primary reaction zone where the feed is charged can be as low as about 1 to less than 5 pounds per cubic foot, although these ranges are non-limiting. An inlet density in the secondary zone, where the recycle liquid and catalyst is charged, below 4 or 4.5 pounds per cubic foot is desirable since this density range is too low to encompass dense bed systems which induce backmixing and catalyst slippage. Although, conversion falls off with a decrease in inlet density to very low levels, the extent of aftercracking is a more limiting feature than total conversion of fresh feed, even at an inlet density of less than 4 pounds per cubic foot. At the outlet of either reaction zone, the density of the corresponding fluid stream will be about half the density at the inlet because the cracking operation in either the recycle liquid or the gas oil charge produced about a fourfold increase in mols of gaseous hydrocarbons. The decrease in density through either reaction zone can be a measure of conversion effected by the cracking reaction.

As noted above a wide variety of hydrocarbon charge stocks can be employed. A suitable primary charge is a gas oil boiling in the range of 430° F. to 1100° F. As much as 5–20 percent of the primary charge can boil above this range, and some residual oil can be charged.

As noted previously all of the distillation column effluent, which we designate as naphtha or middle distillates, can be recycled through the catalytic unit. Typically, the middle distillates can include materials boiling between about 180° F. and about 330° or 375° F. With the naphtha fraction, the distillate fuel oils (about 375° F. to about 430° F.) can also be recycled, or, alternatively, withdrawn for other uses. A particularly advantageous recycle naphtha is one containing a relatively large proportion of olefins or aromatics or a combination of these. For example, a desirable recycle naphtha or middle distillate is one containing at least 10 percent and desirably a greater quantity of olefins. A similar range of aromatics is desirable either in conjunction or substitution of the olefinic material.

EXAMPLE I

That portion of the normally liquid effluent, having a boiling range of 180°–330° F., is recycled to a secondary reaction zone in the catalyst stream with a temperature of about 150° F. to about 300° F. above the primary reaction zone temperature. A preponderance of $C_2$–$C_5$ petrochemicals, $C_4$–$C_7$ light gasolines, and fuel oil distillate results.

EXAMPLE II

A naphtha (180°–330° F.) effluent having the following composition range is recycled under the conditions of Example I:

| | Percent by volume |
|---|---|
| Aromatics | 20–40 |
| Olefins | 20–60 |
| Saturates | 15–25 |

The product of Example I is shifted progressively toward an increased production of light gasolines and petrochemicals.

EXAMPLES III AND IV

With the naphtha recycle of Example I, fuel oil distillates of about 330° to 375° F. and 330° to 430° F. are recycled, respectively. The product of Example I is shifted progressively toward an increased production of light gasolines and to a lesser extent toward increased petrochemical production.

EXAMPLE V

In addition to the naphtha recycle of Example I, 15–40% of unconverted gas oil by volume based on the primary charge gas oil is recycled to the primary reaction zone. An increased production of distillate fuel oil and to a lesser extent an increased production of light gasolines results.

A suitable reactor regenerator distillation system for performing our invention will now be described with reference to the drawing. The cracking of the primary hydrocarbon feed occurs in the primary reaction zone which includes in this example an elongated reactor tube 10 usually referred to as a riser. In the illustrated apparatus the riser has a length to diameter ratio of about 20–25. A full range hydrocarbon oil to be cracked is fed through preheater 2 to heat the oil to about 600° F. and is then charged into the bottom of the riser 10 through an inlet line 14. If desired steam or other inert diluent can be introduced through inlet conduit 18 or directly to the primary zone through line 22, where desired for minor adjustments in primary charge pressure, residence time, catalyst fluidization, etc. Such diluent if used can for example aid in carrying upwardly into the riser 10 the regenerated catalyst stream flowing to the bottom of the riser 10 through transfer line 26.

The aforementioned recycle liquid is added to the transfer line 26 through recycle conduit 27 from distillation column 28. The recycle liquid is added at a predetermined distance upstream from the junction of the transfer line 26 and the riser 10 which defines the corresponding secondary reaction zone. The boiling range of the recycle material can be variously selected as described previously, by means of branched and valved conduit 27a, depending upon specific application of this feature of the invention. The catalyst to oil ratio both in the transfer line 26 (secondary reaction zone) and in the riser 10 (primary reaction zone) can be adjusted as required by means of valves 40, 41 and 42, along with valves 41a or 41b in alternative recycle conduit 59a or 59b, if unconverted gas oil is also recycled, as described below.

It will be seen from the drawing, that the recycle and naphtha effluent is added sufficiently upstream (conduit 27) of the riser 10 in this example to achieve a prescribed contact time or residence time of the recycle and catalyst streams within the secondary reaction zone. In this case, the residence time is about 2 seconds although considerable variation up to about 20 seconds is possible depending upon a specific application of the invention. Up to about 80 percent of the recycle naphtha or similar recycle material can be converted in the secondary reaction zone, i.e. in the transfer line 26, and as the recycle liquid is more refractory than the primary hydrocarbon feed, substantially all of the recycle conversion takes place in the transfer line.

It will be understood, of course, that both the recycle material and the primary hydrocarbon can be added directly to the riser 10, for example through alternative inlets 22, 29 respectively. The distance between the entry points of the inlets 22, 29 would determine the secondary reaction zone in this case.

The primary hydrocarbon feed to be cracked in the riser 10 and fed through line 14 or 29 desirably has a boiling range of about 430° F. to about 1100° F. The catalyst employed is a fluidized zeolite aluminosilicate and is introduced into the riser 10 adjacent the bottom thereof where the riser is adjoined with the descending transfer line 26. Depending upon the boiling range of a specific hydrocarbon feed, the riser temperature is maintained within the range of about 900° F. to 1100° F. and preferably within the range of 950° F. and 1000° F. The riser temperature is controlled by measuring the temperature of the reaction products issuing from the riser 10 and then by adjusting the opening of valve 40 by means of temperature control 43 to regulate the inflow of hot regenerated catalyst through transfer line 26.

The temperature of the regenerated catalyst as it flows from the regenerator 64 into the transfer line 26 is considerably above the control temperature in the riser 10 or primary reaction zone so that the incoming catalyst contributes heat to the cracking reactions of the naphtha recycle in the lower portion of the transfer line 26 and as well as the gas oil in the riser 10. The riser pressure desirably is in the range of about 10–35 p.s.i.g. Between about 15 and 40 percent of the oil charge to the riser 10 can be recycled unconverted materials or bottoms from column 28 added through conduits 59 and 59a and valve 41a to primary charge conduit 14. Alternatively the bottoms can be drawn off for other uses through conduits 59 and 59c and valve 41c for other uses, or added with the recycle naphtha (conduits 59, 59b, 27 and valve 41b) to the secondary reaction zone.

The residence time of the gas oil, converted naphtha and catalyst in the riser 10 is very small and ranges from about 0.5 to 5 seconds. The residence time in the primary reaction zone or riser 10 usually is shorter than in the secondary reaction zone or lower portion of the transfer line 26. The velocity of the catalytic streams through the apparatus is about 35–55 ft. per second, in order to minimize or prevent altogether any slippage between the hydrocarbon and catalyst, particularly in the riser 10. Therefore, no bed of catalyst is permitted to build up throughout the apparatus, and in furtherance of this purpose, the density within the riser 10 is a very low maximum of about four pounds per cubic foot at the bottom of the riser and decreases to about two pounds per cubic foot at the top of the riser. Since no dense bed of catalyst is permitted to build up within the transfer line 26 and riser 10, the space velocity through the apparatus is unusually high and will have a range between 100 or 120 and 600 weight of hydrocarbon per hour per inventory weight of catalyst in the reactor. The instantaneous catalyst inventory within the lower portion of the transfer line 26 and in the riser 10 is due to a flowing catalyst to oil weight ratio in the range of about 4:1–15:1, the weight ratio being based on the feed rate.

The hydrocarbon and catalyst exiting from the top of the riser 10 is passed into a disengaging vessel 44. The top of the riser is capped at 46 so that discharge occurs through lateral slots 50 for proper dispersion. An instantaneous separation between hydrocarbon and catalyst occurs in the disengaging vessel, which terminates the cracking reaction. The hydrocarbon which separates from the catalyst is gasoline together with some heavier components and a considerable quantity of lighter gaseous components. As noted above, the respective proportions of these products can be varied by changing the recycle rate of the temperature range of the recycled fraction, or by recycling part or all of the distillation bottoms. It is also contemplated that bottom recycle can be eliminated, whereupon the bottoms are withdrawn through conduits 59, 59c.

The hydrocarbon effluent passes through a cyclone system 54 to separate catalyst fines contained therein and is discharged to the fractionator or distillation column 28 through line 56. The fractionator 28 separates the effluent product into product gases ($C_2$–$C_5$ or $C_6$) and lighter through line 57, fuel oil and other bottoms through line 59, light gasolines (line 61), and in this case recycle naphtha or middle distillates, to which fuel oil distillate can be added (branched conduit 27a). Where a substantially total product of petrochemical gases is desired, the light gasoline outlet 61 can be connected (not shown) to the transfer line 26 to recycle these normally liquid materials also.

The catalyst separated from hydrocarbon in the disengager 44 immediately drops below the outlets of the riser so that there is no catalyst level in the disengager but only in a lower stripper section 58. Steam is introduced into the catalyst stripper section 58 through sparger 60 to remove any entrained hydrocarbon in the catalyst.

The catalyst stream leaving the stripper 58 passes through transfer line 62 to a regenerator 64. This portion of the catalyst contains carbon deposits which tend to lower its cracking efficacy, and as much carbon as possible must be burned from the surface of the catalyst. As noted previously, virtually all of the carbon deposit is derived from cracking of the primary hydrocarbon charge in the primary reaction zone.

Burning is accomplished by introduction to the regenerator through line 66 of approximately the stoichiometrically required amount of air for combustion of the carbon deposits. The catalyst from the stripper enters the bottom section of the regenerator in a radial and downward direction through transfer line 62. Flue gas leaving the dense catalyst bed in regenerator 64 flows through cyclones 72 wherein catalyst fines are separated from flue gas permitting the flue gas to leave the regenerator through line 74 and to pass through a turbine 76 before leaving for a waste heat boiler wherein any carbon monoxide contained in the flue gas is burned to carbon dioxide to accomplish heat recovery. Turbine 76 compresses atmospheric air in air compressor 78 and this air is charged to the bottom of the regenerator through line 66.

The temperature throughout the dense catalyst bed in the regenerator is in the neighborhood of 1250° F. and preferably is maintained about 250° F. above the operating temperature in riser 10. The temperature of the flue gas leaving the top of the catalyst bed in the regenerator can rise owing to afterburning of carbon monoxide to carbon dioxide. Approximately a stoichiometric amount of oxygen is charged to the regenerator and the reason for this is to minimize afterburning of carbon monoxide to carbon dioxide above the catalyst bed to avoid injury to the equipment since at the temperature of the regenerator flue gas some afterburning does occur. In order to prevent excessively high temperatures in the regenerator flue gas resulting from afterburning, the temperature of the regenerator flue gas is controlled by measuring the temperature of the flue gas entering the cyclones and then venting some of the pressurized air otherwise destined to be charged to the bottom of the regenerator through vent 80 in response to this measurement. The regenerator reduces the carbon content of the catalyst from $1\pm0.5$ weight percent to 0.2 weight percent or less. If required, steam is available through line 82 for cooling the regenerator. Makeup catalyst is added to the bottom of the regenerator through line 84. Hopper 86 is disposed at the bottom of the regenerator for receiving regenerated catalyst to be passed to the transfer line 26 (secondary reaction zone) and to the riser 10 (primary reaction zone).

It is known, of course, to recycle a portion of the unconverted portion of the primary hydrocarbon feed, usually a heavy gas oil of at least 650° F. and containing catalyst slurry. Seldom is more than a 5% recycle rate of such material employed. Our recycle arrangement is highly unusual and unexpected, as we recycle gasoline naphtha or fuel oil distillates, usually at much greater rates. These recycled materials are in themselves desirable products, such that their value as recycle material is entirely unsuspected. Similarly, the values generated by a combined recycle of naphtha and related product, and of refinery bottoms are quite unexpected.

From the foregoing it will be apparent that novel and efficient forms of catalytic cracking plant and method have been described herein. While we have shown and described certain presently preferred embodiments of the invention and have illustrated presently preferred methods of practicing the same it is to be distinctly understood that the invention is not limited thereto but may be otherwise variously embodied and practiced within the scope of the following claims.

We claim:

1. A process for cracking a primary hydrocarbon charge in the presence of a stream of zeolite fluidized cracking catalyst to increase the selectivity of said process for one or more classes of lower boiling constituents including a preponderance of petrochemicals such as light aromatics and olefins, light gasolines, full range gasolines, olefinic gasolines, and the like, said process comprising the steps of maintaining a predetermined range of temperatures within said catalyst stream, adding said charge to said zeolite catalyst stream, separating a pyrolitic naphtha fraction of the products of said cracking process, recycling at least a portion of the naphtha fraction boiling below about 330° F. to said zeolite catalyst stream, adding said naphtha portion to said catalyst stream at a point having a higher temperature than that at which said charge is added so that a significant proportion of said naphtha portion is cracked by said catalyst, said higher temperature being in the range of about 1050° F. to about 1400° F., said naphtha portion being added sufficiently upstream of the principal charge addition so that conversion of said naphtha portion is substantially completed prior to admixture with said charge to lower further the partial pressure of said charge and to produce a predetermined quantity of olefins from said naphtha, limiting the residence times of said naphtha portion and said primary hydrocarbon charge in said fluidized catalyst stream to avoid masking of said increased selectivity by after-cracking and or polymerization of cracked products either of said naphtha or of said charge, and adding a sufficient quantity of said charge to carbonize said catalyst for self-sustaining regeneration thereof, whereby said naphtha can be continuously converted and the output of said process is shifted toward the production of one or more of said petrochemicals, light gasolines and the like.

2. The process according to claim 1 including the modified step of adding said recycled naphtha to said catalyst stream at a point having a temperature in the range of about 150° F. to about 300° F. higher than that at which said primary charge is added.

3. The process according to claim 1 including the additional steps of adding said naphtha to said catalyst stream at a predetermined point upstream of said principal charge addition, and separating the points of said naphtha and said charge additions to aid in establishing a predetermined residence time of said naphtha in said catalyst stream prior to cracking of said primary charge.

4. The process according to claim 1 including the additional step of recycling an unconverted portion of said primary charge to said catalyst stream.

5. The process according to claim 4 including the modified step of recycling said unconverted portion in the range of about 15% to about 40% by volume of the primary hydrocarbon charge.

6. The process according to claim 1 including the modified step of adding said naphtha in the range of about 5% to about 45% by volume of the primary hydrocarbon charge.

7. The process according to claim 1 including the additional step of establishing a ratio of said naphtha to said primary charge and establishing a residence time of said primary charge in said catalyst stream such that a greater percentage yield of gaseous petrochemicals based on total hydrocarbon feed is recovered from said process in the presence of said naphtha than could be recovered from said process in the absence of said naphtha.

8. The process according to claim 1 including the additional step of establishing the ratio of said naphtha to said primary charge such that a greater percentage yield of light gasoline based on total primary charge is recovered from said process in the presence of said naphtha than could be recovered from said process in the absence of said naphtha.

9. The process according to claim 1 including the additional step of establishing the ratio of said naphtha to said primary charge and a predetermined temperature and residence time of said naphtha in said catalyst stream prior to engagement with said primary charge such that the production of intermediate distillates and heavy gasolines is minimized.

10. The process according to claim 1 including said modified step of recycling substantially all of the naphtha to said catalyst stream.

11. The process according to claim 1 including the modified step of recycling that portion of said naphtha boiling between about 150° F. and about 330° F.

12. The process according to claim 1 including the modified step of recycling that portion of said naphtha boiling between about 180° F. and about 330° F.

13. The process according to claim 1 including the modified step of recycling the $C_6$–330° F. fraction of said naphtha.

14. The process according to claim 1 including the modified step of recycling the $C_7$–330° F. fraction of said naphtha.

15. The process according to claim 1 including the modified step of recycling the iso-$C_7$–330° F. fraction of said naphtha.

16. The process according to claim 2 including the modified step of adding said naphtha to a point in said catalyst stream having said higher temperature of about 250° F.

17. The process according to claim 1 including a modified step of recycling the fuel oil distillate product of said cracking process with said naphtha.

18. The method according to claim 1 including the additional step of limiting the density of said catalyst stream adjacent the entry of said recycled naphtha to a maximum of about five (5) lbs. per cubic foot in order to avoid catalyst buildup.

19. The method according to claim 1 including the additional step of establishing a space velocity of said charge of at least one hundred weight of charge per hour per weight of catalyst inventory in order to avoid catalyst buildup.

20. The method according to claim 18 including the modified step of limiting the density of said catalyst stream to a range of about one to about four (4) lbs. per cubic foot.

21. The method according to claim 1 including the additional step of limiting the residence time of said charge in said stream to a maximum of about ten (10) seconds.

22. The method according to claim 1 including the additional step of limiting the total residence time of said naphtha in said stream to about twenty (20) seconds.

23. The method according to claim 21 including the modified step of limiting said residence time to a maximum of about five (5) seconds.

24. The method according to claim 22 including the modified step of limiting said total residence time to about ten (10) seconds.

25. The process according to claim 1 including the additional step of adjusting a weight ratio of said catalyst and said primary hydrocarbon charge between about 4:1 and about 25:1.

26. The process according to claim 25 including the modified step of adjusting said ratio to within about 6:1 to about 10:1.

27. The process according to claim 25 including the additional step of adjusting a weight ratio of said catalyst to said naphtha to between about 15:1 to about 100:1.

28. The process according to claim 1 including the additional step of adjusting the composition of said naphtha to contain at east 10% olefins.

29. The process according to claim 1 including the additional step of adjusting the composition of said naphtha to contain at least 10% aromatics.

30. The process according to claim 28 including the modified step of adjusting said naphtha composition to include at least 10% aromatics.

31. The process according to claim 14 wherein said naphtha includes about 20 to 40% aromatics, about 20 to 60% olefins, and about 15 to 25% saturates.

32. The process according to claim 1 including the additional step of maintaining a linear velocity of said primary hydrocarbon charge in said zeolite catalyst of between about 25 and about 75 feet per second.

33. The process according to claim 1 wherein the residence time of said primary hydrocarbon charge in said catalyst stream is between about 0.5 and about 5 seconds, and the residence time of said naphtha in said catalyst stream is between about 2 and about 10 seconds.

34. The combination according to claim 1 wherein said process is carried out in cracking apparatus including a riser tube and a transfer line connected thereto, said charge being added to said riser tube with at least a portion thereof added adjacent the junction thereof with said transfer line, and said naphtha is added to said transfer line at a point upstream of said junction.

35. The method according to claim 1 wherein the distance of said naphtha addition upstream of said principal charge addition is varied from a minimum distance at which the production of olefins and other petrochemicals is maximized to a maximum distance whereat the production of light gasolines and the like is maximized.

References Cited

UNITED STATES PATENTS

| | | | |
|---|---|---|---|
| 3,617,497 | 11/1971 | Bryson et al. | 208—80 |
| 2,890,164 | 6/1959 | Woertz | 208—74 |
| 2,893,943 | 7/1959 | Vignovich | 208—78 |
| 2,908,630 | 10/1959 | Friedman | 208—153 X |
| 3,042,196 | 7/1962 | Payton et al. | 208—113 |
| 3,158,562 | 11/1964 | Peet | 208—153 X |
| 3,186,805 | 6/1965 | Gomory | 208—153 X |
| 3,424,672 | 1/1969 | Mitchell | 208—164 |
| 3,448,037 | 6/1969 | Bunn, Jr. et al. | 208—74 X |
| 2,921,014 | 1/1960 | Marshall | 208—74 |

DELBERT E. GANTZ, Primary Examiner

U.S. Cl. X.R.

208—74, 164